(12) United States Patent
Erb et al.

(10) Patent No.: US 8,327,137 B1
(45) Date of Patent: Dec. 4, 2012

(54) SECURE COMPUTER SYSTEM WITH SERVICE GUEST ENVIRONMENT ISOLATED DRIVER

(75) Inventors: Paul Erb, Austin, TX (US); Geoffrey Strongin, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 962 days.

(21) Appl. No.: 11/324,145

(22) Filed: Dec. 30, 2005

Related U.S. Application Data

(60) Provisional application No. 60/665,325, filed on Mar. 25, 2005.

(51) Int. Cl.
*H04L 29/06* (2006.01)

(52) U.S. Cl. .......................... 713/164; 718/1

(58) Field of Classification Search .............. 726/11, 726/22, 26; 709/224
See application file for complete search history.

(56) References Cited

U.S. PATENT DOCUMENTS

| | | | |
|---|---|---|---|
| 6,067,589 | A | 5/2000 | Mamata |
| 6,854,039 | B1 * | 2/2005 | Strongin et al. ............ 711/163 |
| 6,895,589 | B2 | 5/2005 | Bermudez et al. |
| 7,082,598 | B1 | 7/2006 | Le et al. |
| 7,111,086 | B1 | 9/2006 | Ecoleston et al. |
| 7,401,230 | B2 | 7/2008 | Campbell et al. |
| 7,478,180 | B1 * | 1/2009 | Li .................................. 710/62 |
| 7,603,670 | B1 * | 10/2009 | van Rietschote ............... 718/1 |
| 7,716,667 | B2 * | 5/2010 | van Rietschote et al. ......... 718/1 |
| 2002/0120157 | A1 * | 8/2002 | Ashkar et al. ............... 549/289 |
| 2004/0003262 | A1 * | 1/2004 | England et al. ............... 713/189 |
| 2004/0133708 | A1 * | 7/2004 | Augustin et al. ................ 710/8 |
| 2004/0165588 | A1 * | 8/2004 | Pandya .......................... 370/389 |
| 2005/0198632 | A1 | 9/2005 | Lantz et al. |
| 2005/0198633 | A1 | 9/2005 | Lantz et al. |
| 2005/0207407 | A1 * | 9/2005 | Baumberger ................. 370/389 |
| 2005/0240685 | A1 * | 10/2005 | Keys ................................ 710/8 |
| 2005/0246718 | A1 | 11/2005 | Erlingsson et al. |
| 2005/0249228 | A1 | 11/2005 | Cornett |
| 2005/0265385 | A1 * | 12/2005 | Cromer et al. ................ 370/466 |
| 2006/0070089 | A1 | 3/2006 | Shoaib et al. |
| 2006/0218320 | A1 | 9/2006 | Avraham et al. |

(Continued)

FOREIGN PATENT DOCUMENTS

WO 2005036358 A1 4/2005

OTHER PUBLICATIONS

USB 2.0 Host Controller Driver Update Application Note, Lumenera Corporation, Mar. 2005, v1.2.*

(Continued)

*Primary Examiner* — Eleni Shiferaw
*Assistant Examiner* — Jing Sims
(74) *Attorney, Agent, or Firm* — Zagorin O'Brien Graham LLP

(57) ABSTRACT

A virtualized computer system includes at least one guest environment (guest), a service guest environment (SG) and trusted software. The at least one guest includes at least one driver having a first private message interface. The SG includes a first USB host controller (HC) driver, which is in communication with a USB HC. The first USB HC driver includes a second private message interface. The trusted software is in communication with the guest and the SG. The trusted software includes a data intercept/routing mechanism that facilitates secure communication between at least one USB device coupled to the USB HC and the guest using the first and second private message interfaces.

10 Claims, 11 Drawing Sheets

U.S. PATENT DOCUMENTS

2007/0011486 A1* 1/2007 Li et al. .............................. 714/5
2007/0061441 A1* 3/2007 Landis et al. ................. 709/224
2009/0150690 A1 6/2009 Chin et al.

OTHER PUBLICATIONS

Advanced Micro Devices, "AMD64 Virtualization Codenamed 'Pacifica' Technology," Secure Virtual Machine Architecture Reference Manual, May 2005, 124 pages.

"AMD 'Pacifica' Virtualization Technology," AMD Pacifica Tutorial, Mar. 30, 2005, 21 pages.

McDowell, Steve and Strongin, Geoffrey, "Pacifica—Next Generation Architecture for Efficient Virtual Machines," Microsoft, WinHEC 2005, 29 pages.

Intoto, Inc., "Virtual Firewalls" White Paper, Enabling Gateway Infrastructure, 2002, 10 pages.

"Documentation/usb/proc_usb_info.txt," May 30, 2003, http://www.mjmwired.net/kernel/Documentation/usb/proc_usb_info.txt, 6 pages.

Renieri et al., "Computer Access I," 2001 (Internet Archive), http://www.fernuni-hagen.de/FTB/telemate/demo-crs/ca-1-3.htm, 5 pages.

U.S. Appl. No. 11/324,012, filed Dec. 30, 2005, entitled "Virtualized Computer System with Secure Input Architecture," naming inventors Paul Erb et al.

U.S. Appl. No. 11/324,016, filed Dec. 30, 2005, entitled "Secure Computer System with Efficient Guest Environment," naming inventors Paul Erb et al.

U.S. Appl. No. 11/324,021, filed Dec. 30, 2005, entitled "Secure Computer System with Para-Virtualized Guest Environment," naming inventors Paul Erb et al.

Non-Final Office Action, mailed Aug. 13, 2009, in U.S. Appl. No. 11/324,021, 18 pages.

Non-Final Office Action, mailed Sep. 1, 2009, in U.S. Appl. No. 11/324,016, 18 pages.

Non-Final Office Action, mailed May 21, 2009, in U.S. Appl. No. 11/324,012, 9 pages.

Final Office Action mailed Dec. 1, 2009 in U.S. Appl. No. 11/324,012, 11 pages.

Final Office Action mailed Mar. 23, 2010 in U.S. Appl. No. 11/324,016, 19 pages.

Final Office Action mailed Feb. 22, 2010 in U.S. Appl. No. 11/324,021, 16 pages.

* cited by examiner

SECURE COMPUTER SYSTEM WITH SERVICE GUEST ENVIRONMENT ISOLATED DRIVER

This application claims the benefit of U.S. Provisional Patent Application Ser. No. 60/665,325, filed Mar. 25, 2005, the disclosure of which is hereby incorporated herein by reference in its entirety for all purposes.

CROSS-REFERENCE TO RELATED APPLICATION(S)

This application is related to U.S. patent application Ser. Nos. 11/324,012 entitled VIRTUALIZED COMPUTER SYSTEM WITH SECURE INPUT ARCHITECTURE, by Paul Erb, Geoffrey Strongin and Richard Brunner; 11/324,016 entitled SECURE COMPUTER SYSTEM WITH EFFICIENT GUEST ENVIRONMENT, by Paul Erb, Geoffrey Strongin and Richard Brunner; and 11/324,021 entitled SECURE COMPUTER SYSTEM WITH PARA-VIRTUALIZED GUEST ENVIRONMENT, by Paul Erb and Geoffrey Strongin, all of which were filed on Dec. 30, 2005, the disclosures of which are all hereby incorporated herein by reference in their entirety for all purposes.

BACKGROUND

1. Field of the Invention

The invention relates to computer system security and, more particularly, to techniques for providing secure input architecture for a computer system.

2. Description of the Related Art

Today, data flow related to a hardware device and between hardware devices, operating systems and applications is not protected in most computer systems. Thus, for example, when typing sensitive data, e.g., a password, on a keyboard, the sensitive data may be compromised. The lack of protection is common to both universal serial bus (USB) input devices and legacy input devices. Legacy input devices include PS/2 keyboard, PS/2 mice and serial mice, which have associated I/O address space (ports) and interrupt lines. In general, the term input device includes any device that can directly input characters into a computer system, without translation, and any device that can direct a screen pointer and cause a change of focus. Broadly, all input data from a device driver has traditionally been routed to operating system (OS) queues, via an interface that is supplied with the OS. The OS of the computer system has then controlled the routing and final destination of the input data.

As is well known, the universal serial bus (USB) standard defines various USB classes, such as a human interface device (HID) class, which details the common operation of input devices, e.g., keyboards, mice, etc. Today, there are three types of USB host controller (HC) interfaces, i.e., universal, open and enhanced. Each of the USB HC interfaces has a system footprint similar to that shown in FIG. 1. In general, each USB HC 106, implemented within a computer system 100, has peripheral component interconnect (PCI) configuration space registers 108 that establish the location of memory or input/output (I/O) mapped registers 110, a system memory 104 presence (where a USB HC driver manages a list of transactions that are to be processed by the USB HC 106, via bus master access) and an interrupt line. The USB HC 106 communicates with the system memory 104, via a memory controller 102. The memory controller 102 is coupled to the USB HC 106, by a system bus 122, and is coupled to the system memory 104, by a memory bus 120. USB supports plug 'n' play capability with dynamically loadable (and unloadable) USB device drivers. The loading of an appropriate USB device driver is facilitated through the implementation of a product identification (PID)/vendor identification (VID) combination.

In general terms, a virtual machine (VM) is software that creates a guest environment (guest) between a hardware platform, i.e., a host computer system, and one or more end users. A VM typically creates a number of different guests on a single host computer system, each of which emulates the host computer system. The software that provides this VM capability is often referred to as a virtual machine monitor (VMM) or hypervisor. The VMM may control the execution of multiple guests, e.g., operating systems and/or applications. Typically, the VMM provides each guest the appearance of full control over a complete computer system (i.e., memory, central processing unit (CPU) and all peripheral devices). Fundamentally, VMMs work by intercepting and emulating operations for one or more guests. Unfortunately, VMMs have not secured input data to a guest, or between guests. As such, each guest may be subject to corruption by another guest or may adversely affect operation of a host computer system.

Accordingly, it would be desirable to provide a more secure environment for operation of computer systems, particularly those that implement virtual machines.

SUMMARY

According to one embodiment of the present invention, a virtualized computer system includes at least one guest environment (guest), a service guest environment (SG) and trusted software. The at least one guest includes at least one driver having a first private message interface. The SG includes a first USB host controller (HC) driver, which is in communication with a USB HC. The first USB HC driver includes a second private message interface. The trusted software is in communication with the guest and the SG. The trusted software includes a data intercept/routing mechanism that facilitates secure communication between at least one USB device coupled to the USB HC and the guest using the first and second private message interfaces.

According to another aspect of the present invention, a virtualized computer system includes at least one guest environment (guest), a service guest environment (SG) and trusted software. The at least one guest includes at least one driver. The SG includes a first USB host controller (HC) driver, which is in communication with a USB HC. The first USB HC driver includes a private message interface. The trusted software is in communication with the guest and the SG and includes a data intercept/routing mechanism that facilitates secure communication between at least one USB device, coupled to the USB HC, and the guest, using the private message interface.

According to another aspect of the present invention, a virtualized computer system includes at least one guest environment (guest), a service guest environment (SG) and trusted software. The at least one guest includes a first universal serial bus (USB) host controller (HC) driver that is in communication with a USB keyboard driver and a USB mouse driver. The USB keyboard driver and the USB mouse driver are both included within the guest. The SG includes a second USB HC driver that is in communication with a USB HC. The second USB HC driver includes a first private message interface. The trusted software is in communication with the guest and the SG. The trusted software includes a data intercept/routing mechanism that facilitates secure communication between at least one USB device, coupled to the USB HC, and the guest, using the first private message interface.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
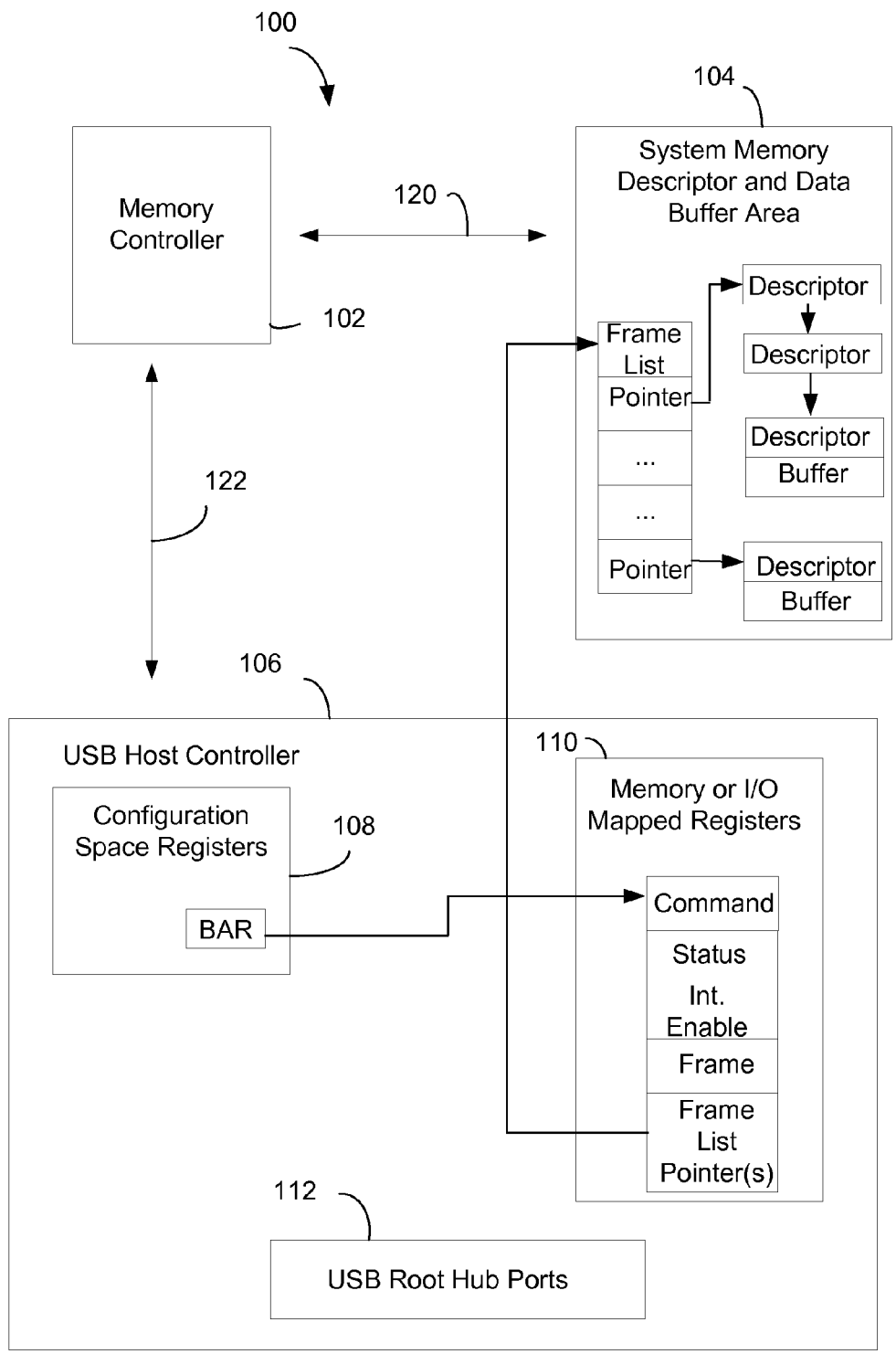
FIG. 1 illustrates a block diagram of a universal serial bus (USB) host controller (HC), as implemented within a relevant portion of a host computer system.

According to various embodiments of the present invention, input devices of a computer system are secured to prevent corruption or theft of information associated with the input devices of the computer system. The securing of input devices is especially desirable in virtualized computer systems that implement a plurality of guest environments (guests), that may corrupt an operating system (OS) of a host computer system or other guests. As used herein, the term "input device" includes legacy (e.g., PS/2 keyboard, PS/2 mouse and serial mouse), and universal serial bus (USB) input devices. The terms "para-virtualized device driver" or "para-virtualized USB host controller (HC) driver, as used herein, refer to a modified (or replacement) device driver or a modified (or replacement) USB HC driver, that are implemented within a guest or service guest, e.g., an OS or application. In general, modified (or para-virtualized) drivers facilitate the implementation of a private secure interface, between a host computer system and a guest, that can be streamlined to increase efficiency of data throughput and reduction of control overhead. The term "trusted software," as used herein, refers to code that has low level control of a host computer system and virtual machine mechanisms that allow the system to launch one or more guests, interface with one or more virtualized or para-virtualized drivers (within the one or more guests) and distribute device control to the one or more guests. As used herein, the term "miniport driver" is a kernel mode device driver specific to a device, e.g., a miniport driver may be a USB device driver. The term "modified drivers," as used herein, includes drivers that are either originally written or modified to make a guest (or service guest) virtual environment aware.

In a typical implementation, a processor of a host computer system is configured to allow trusted software to intercept: accesses to PCI configuration space; accesses to memory and I/O mapped registers (e.g., USB host controller (HC) registers); accesses to physical shared memory area that includes USB HC data structures; and interrupts (to be handled by trusted software or redirected). In this manner, software attacks from a guest can be intercepted such that USB HC activities are not corrupted. It should be appreciated that since intercepts point to an opcode, associated operands are required to be extracted from a code stream to determine source and destination addresses. In general, it is desirable to implement a hardware filtering mechanism (HFM), within the host computer system, that restricts hardware bus master accesses to USB HC data structures in system memory. In various embodiments, an HFM: restricts master/direct memory access (DMA) activity from a USB HC to specific areas in memory; restricts peer master/DMA activity (configuration cycles, memory and I/O) from accessing memory and I/O mapped register spaces of the USB HC; and does not allow direct destinations of device master/DMA activity. In various embodiments, trusted software maintains control of bus bridge registers, bus input/output (I/O), advanced programmable interrupt controller (APIC) and programmable interrupt controller (PIC) registers and all USB HCs coupled to a system bus.

Input Device Data Protection

According to various aspects of the present invention, input device protection is implemented to isolate and control data from one point in a computer system to another, while preventing intervention and probing of that data by other hardware or software. Processor and system bus facilities are two of the areas involved in input device data protection. In one embodiment, a processor isolates all software access to an input device by intercepting all accesses and interrupts associated with the device. Trusted software, as is described herein, assures that a correct guest (software client) has access to associated data and indirect control of an associated input device.

Figure 2:
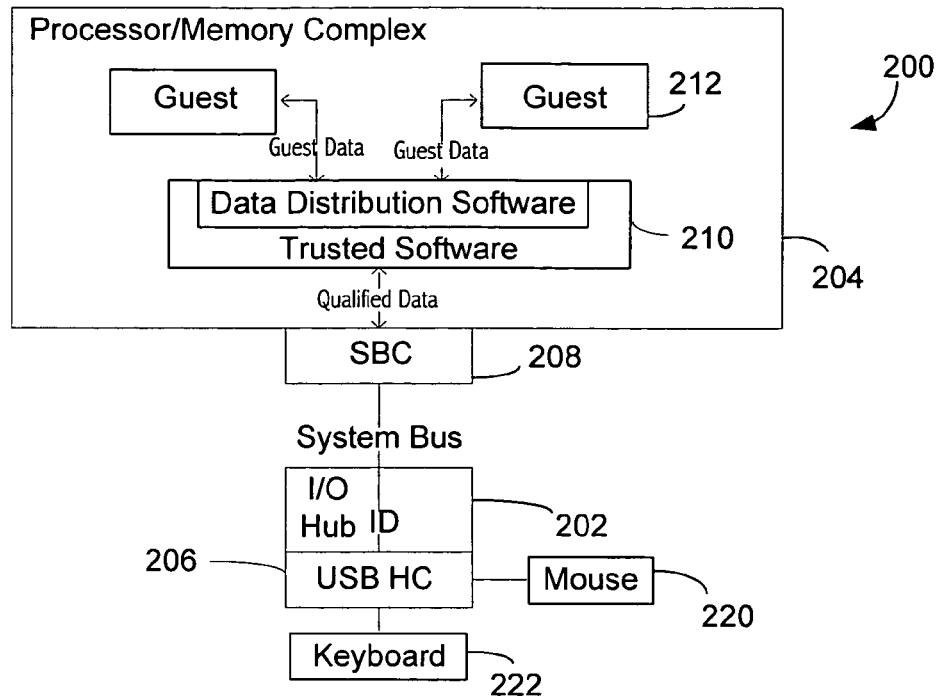
FIG. 2 is a block diagram of a relevant portion of a host computer system, configured according to one embodiment of the present invention.

With reference to FIG. 2, in one embodiment, a host computer system 200 implements a system bus controller (SBC) 208 that identifies all data traffic on a system bus. It should be appreciated, from the discussion herein, that securing devices coupled to a universal serial bus (USB) host controller (HC) is readily achievable, as each USB HC is assigned a unique identification (ID). Further, each of the USB devices that are coupled to a USB HC have a unique ID (i.e., the ID of an associated USB HC) that accompanies all sourced data packets. Thus, the SBC 208 can monitor and control accesses to assigned memory spaces, by examining source IDs and destination addresses of traffic on the system bus. Memory entries for specific USB devices, coupled to a given USB HC, may be maintained in a linked list, doubly-linked list, etc. The SBC 208 may, for example, maintain an allowable access table setting forth an assigned memory space for each USB HC.

The SBC 208 maintains destination memory address ranges for each USB HC and uses an ID associated with each data packet to determine if a destination memory address range is correct for a given data packet. That is, the SBC 208 determines whether a data packet has access rights related to a destination memory address. In addition, as is discussed in further detail below, all data packets may be routed through the SBC 208 in order to control peer-to-peer traffic. In other embodiments, where legacy input devices are not capable of unique identification, a more generalized classification or grouping of data traffic can be utilized or a mechanism to provide IDs for such devices may be implemented. As legacy input devices utilize I/O based register sets and cannot perform bus master activity, security of legacy input devices may be maintained by intercepting I/O accesses and interrupts. As such, all data returned from reading a port is assigned the ID of an associated I/O hub. An SBC may then monitor IDs to prevent peer-to-peer traffic from corrupting registers of an associated central processing unit (CPU). The implementation of IDs for peripheral devices of a computer system advantageously provides a mechanism for preventing one of the devices from corrupting registers of or snooping data associated with the other devices.

As is shown in FIG. 2, the system 200 includes a USB keyboard 222 and mouse 220 coupled to a USB HC 206, which is connected to the SBC 208, via an input/output (I/O) hub 202. The I/O hub 202 assigns a unique ID to the USB HC 206, thus, allowing the SBC 208 to determine which USB HC originated the traffic. While only one USB HC is depicted in the system 200, it should be appreciated that the system 200 may be configured to include multiple USB HCs. By examining a data packet from a device coupled to the USB HC 206, the SBC 208 can determine the USB HC from which the traffic originated. The SBC 208 is coupled to a processor/memory complex (e.g., a processor including a north bridge) 204, which defines a software realm for trusted software 210 (including data distribution software) and guests 212.

Figure 3:
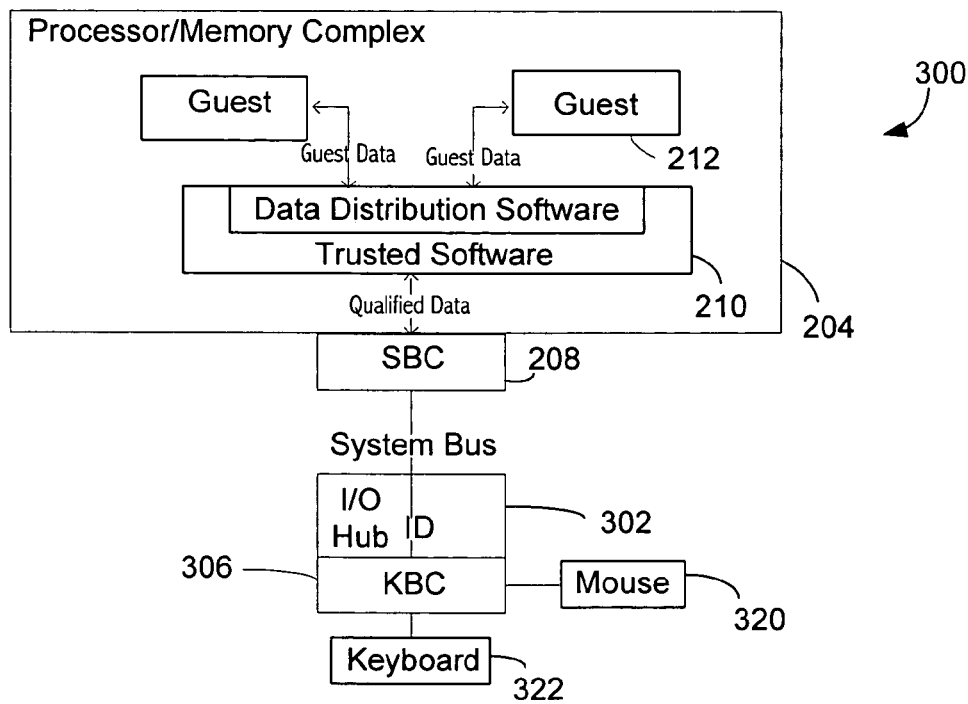
FIG. 3 depicts a block diagram of a relevant portion of a host computer system, configured according to another embodiment of the present invention.

The data distribution software routes qualified traffic (i.e., traffic passed by the SBC 208) to an appropriate guest 212, determined by, for example, which guest is in focus or which guest is currently allowed to utilize peripherals devices of the system 200. In the event that a device coupled to the USB HC 206 attempts to write data to an address out of its assigned range, the SBC 208 prevents the data from being written and may provide an error message to the device and/or to the trusted software 210. The trusted software 210 may then take steps to prevent the offending device from sending further traffic through the USB HC 206. In at least one embodiment, and with reference to FIG. 3, a relevant portion of a computer system 300 is depicted that provides a PS/2 keyboard and mouse controller (KBC) 306, coupled to I/O hub 302 (that is configured to assign IDs for legacy input devices, e.g., PS/2 keyboard 322 and PS/2 mouse 320). This provides a computer system that is capable of discrimination of accesses from different legacy devices and, thus, allows for the regulation of access to system resources, such as CPU registers. By implementing a partition between resources allocated to different devices, one device cannot corrupt data associated with another device and/or registers of another device.

Virtualization for Achieving Security Objectives

Figure 4:
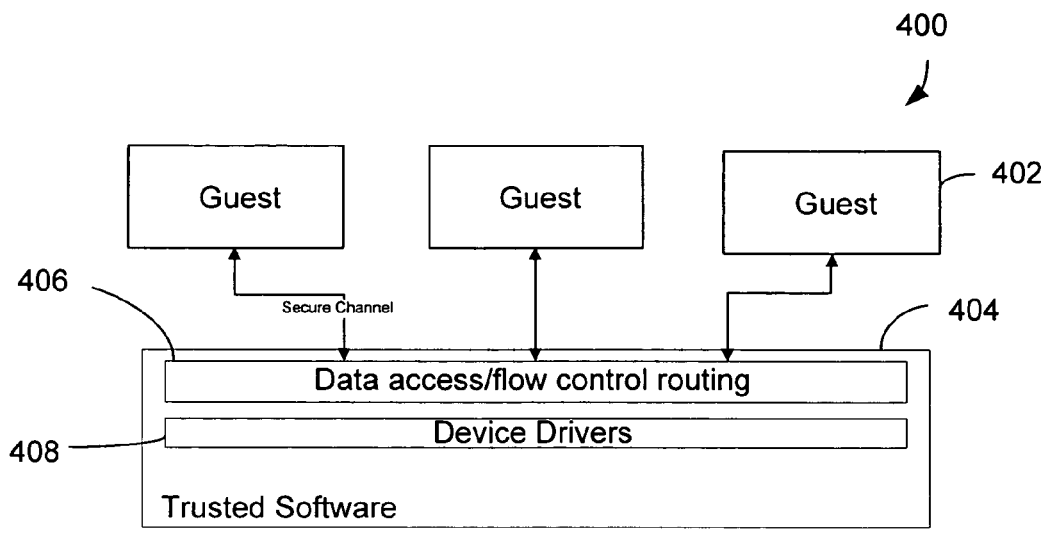
FIG. 4 is a system software diagram, configured according to an embodiment of the present invention.

According to various aspects of the present invention, a host computer system is protected from attacks by external software and from software executing within one or more guest environments (guests) launched on the computer system, as well as peripheral devices coupled to the computer system. As noted above, a host computer system that includes a virtual machine monitor (VMM) provides for the creation of multiple guests. According to this aspect of the present invention, trusted software is used in conjunction with the hardware mechanism, discussed above, to provide secure guests isolated from an operating system (OS) of the computer system and from other guests. With reference to FIG. 4, a block diagram of a relevant portion of various software 400 that may execute on a secured host computer system is depicted. As is shown, trusted software 404, which includes device drivers 408, is provided that has exclusive control over hardware devices of the computer system.

The trusted software 404 controls accesses to system memory and manages all system input and output between guests 402 and hardware devices. The trusted software 404 implements a data access/flow control routing module 406 to provide a data access and a flow control routing mechanism. For example, when a particular guest is in focus, the module 406 routes all input data to the in-focus guest over a secure channel. The secure channel may be implemented by, for example, assigning each guest a separate area of system memory for communication. According to this aspect, the module 406 monitors access to system memory and prevents guests from accessing memory outside their assigned address range. In general, the module 406 isolates software executing within a guest so that it cannot affect other guests, e.g., corrupt memory assigned to another guest. The trusted software 404 also isolates the VMM to prevent the guests and hardware devices of the computer system from adversely affecting the VMM.

As noted above, one aspect of providing a secure computing environment is to provide secure input data to a guest. In order to do so the computer system discriminates among access from different devices and provides different levels of access to system resources, such as memory, based on the device. The computer system implements a partition between the resources used for communication with input controllers and the resources used for communication with other devices, such that other devices have no access to the resources used for input controller communications. The computer system implements internal partitioning of software objects and may restrict some software objects from obtaining access to resources that are allocated to other software objects. In addition, the computer system includes a protected data access/flow control routing mechanism (i.e., data distribution software object) that is involved in the transfer of data from input devices. Typically, the data distribution software object is allowed access to input device data and other software objects are denied access to the data. Thus, the distribution software directs protected data traffic relating to a keyboard and mouse (USB and/or PS/2) to appropriate recipient software and only to an appropriate guest.

Secure Data Routing Capability within a Topology

Figure 5:
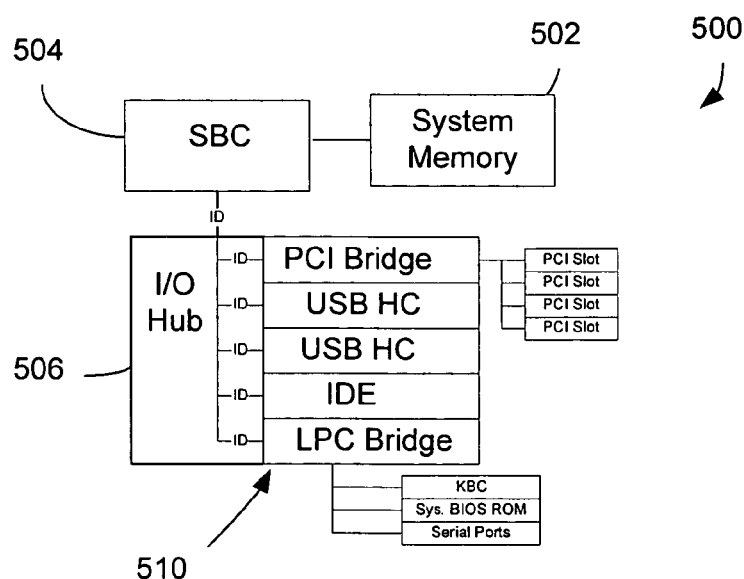
FIG. 5 is a block diagram of a relevant portion of a host computer system, configured according to yet another embodiment of the present invention.

With respect to peer-to-peer traffic, it is desirable to determine if a hardware data source, within a computer system topology, that is attempting to perform a direct memory access (DMA) transfer has permission to alter a region specified, in a destination address, in system memory. In general, it is desirable for a computer system to disallow peer hardware memory alteration or have a mechanism to screen peer-to-peer traffic. By controlling data accesses, secure data channels can be established. Referring to FIG. 5, an exemplary architecture 500 for secure data routing is depicted. According to this aspect of the present invention, each packet on a system bus has an associated identification (ID) that relates the packet to a specific data source 510. For example, the data source 510 may be a PCI bridge, one or more USB host controllers (HCs), an integrated drive electronics (IDE) interface, a low pin count (LPC) bridge, etc., or a device coupled to one of the interfaces.

According to this aspect of the present invention, a system bus controller (SBC) 504 allows (or disallows) data packets to reach their destination according to an ID of the source and rules that have been created in the SBC 504. For example, the rules may state that DMA transfers are never allowed between devices coupled to different USB HCs or allow peer-to-peer transfers only between certain selected devices. The control of peer-to-peer transfers between hardware devices allows a computer system to provide secure data transfer between hardware devices of the computer system. In this manner, a computer system can secure system memory 502 by denying access to memory areas to which a peripheral device does not have privilege to modify.

Secure Input Data Control

Figure 6:
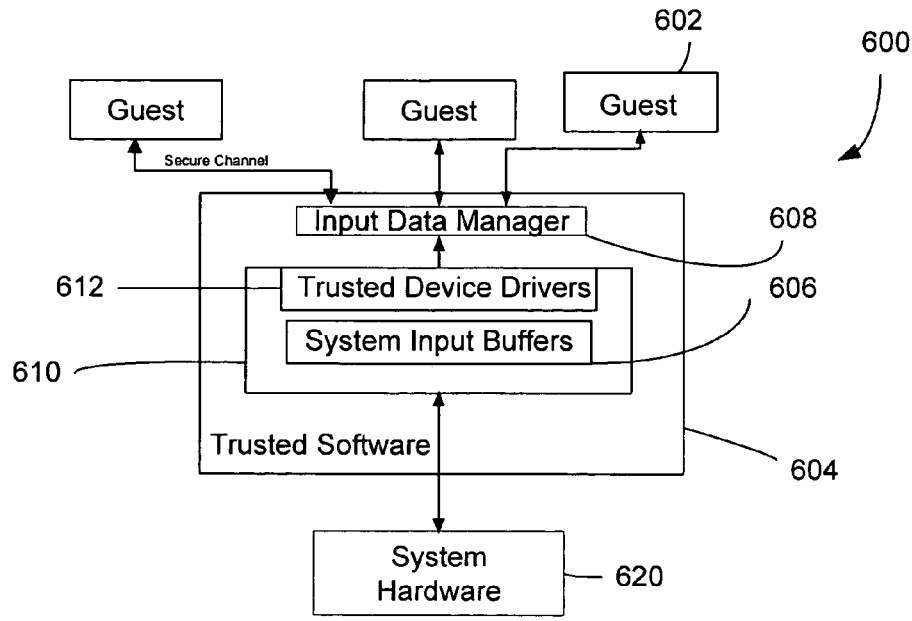
FIG. 6 is a block diagram of a relevant portion of a host computer system, in communication with system software, configured according to an embodiment of the present invention.

Turning to FIG. 6, a relevant portion of a host computer system 600 is depicted that provides for secure routing of input data from a data source to a particular guest 602. The embodiment of FIG. 6 is similar to the embodiment shown in FIG. 4. Trusted software 604 of the system 600 includes an input data manager 608 and a partition 610 that includes trusted device drivers 612 and system input buffers 606. It should be appreciated that routing keystrokes and mouse actions from system hardware 620 to an appropriate destination is more generally a software problem, in host computer systems that include mechanisms to control access to hardware devices. Through a menu system or other designation, the input data manager 608 can fix delivery of input traffic to a single one of the guests 602. In this manner, the input data manager 608 intercepts all attempts to compromise a data stream and, thus, keeps an input channel secure. The input data manager 608 may provide exclusive access to a particular set of input devices for a duration determined by, for example, a user of a secure channel. The input data manager 608 may be designed to assure that the system input buffers 606 are purged, before switching to another guest 602. In this manner, a host computer system that is capable of securing input data to a designated guest is provided.

USB Keyboard and Mouse to Virtual Keyboard Controller Translation

Traditionally, in virtualized computer systems with universal serial bus (USB) keyboards and mice, guest environments (guests) have been aware of the USB hardware and, as such, have, at least in some respects, been required to participate in the management of the USB hardware. However, as noted above, virtualized computer systems have not generally provided a secure channel for input data. According to one embodiment of the present invention, USB keyboard and mouse virtualization is simplified by implementing a legacy input device driver, e.g., a PS/2 keyboard and mouse controller (KBC) driver, that utilizes simple I/O accesses and interrupts within each guest. In general, legacy personal computer (PC) devices provide relatively simple virtual device implementations as they have only an I/O mapped register set and, in most cases, an associated interrupt. Moreover, according to this aspect of the present invention, as each of the guests are unaware of the USB hardware, the guests are not required to participate in the management of the USB hardware. According to this embodiment of the present invention, when a guest is initialized, the host computer system allows the guest to detect one or more legacy input devices, e.g., a keyboard and/or mouse. Trusted software then routes input data from USB hardware to trusted software input queues. The input data is then routed, via a data intercept/routing mechanism, to an appropriate one of the guests. In general, interrupts may be provided to the guests by a virtual machine monitor (VMM), responsive to trusted software.

Figure 7:
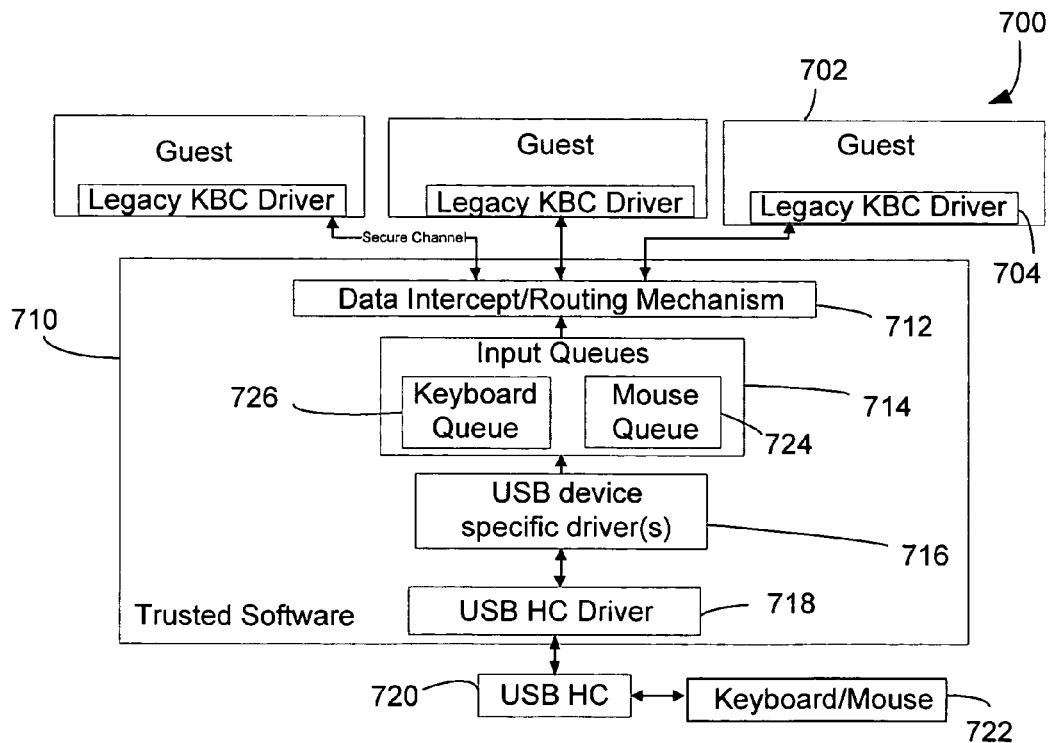
FIG. 7 is a block diagram of a relevant portion of a host computer system, with guests that implement a legacy input device driver, e.g., a PS/2 keyboard and mouse controller (KBC) driver, configured according to one embodiment of the present invention.

As is shown in FIG. 7, a USB keyboard and USB mouse 722 are coupled to a USB host controller (HC) 720, which is in communication with a USB HC driver 718 (located within trusted software 710). The USB HC driver 718 routes input data from the USB keyboard 722 to a USB keyboard driver 716, located within the trusted software 710. Similarly, input data from the USB mouse 722 is routed to a USB mouse driver 716, located within trusted software 710. The input data from the USB keyboard driver 716 is routed to a keyboard message queue 726, located within the trusted software 710. Similarly, the input data from the USB mouse driver 716 is routed to a mouse message queue 724, located within the trusted software 710. In a typical implementation, port reads from a legacy PS/2 keyboard and mouse controller (KBC) driver 704, located within a guest 702, are intercepted by the data intercept/routing mechanism 712.

Input data is then provided from an appropriate one of the queues 724 and 726 of input queue 714, which is located within the trusted software 710. In various embodiments, the trusted software 710 clears the input queues 714 when changing between guests 702, such that one guest cannot access input provided to another guest. It should be appreciated that a secure channel for each guest can be achieved in a number of different ways. For example, trusted software may communicate with each guest by assigning each guest a different range of addresses within system memory. Alternatively, common memory locations may be utilized for communication between guests and peripheral devices. In this case, the trusted software may clear the common memory when changing between guests.

Fully Virtualized Guest with USB Host Controller

Figure 8:
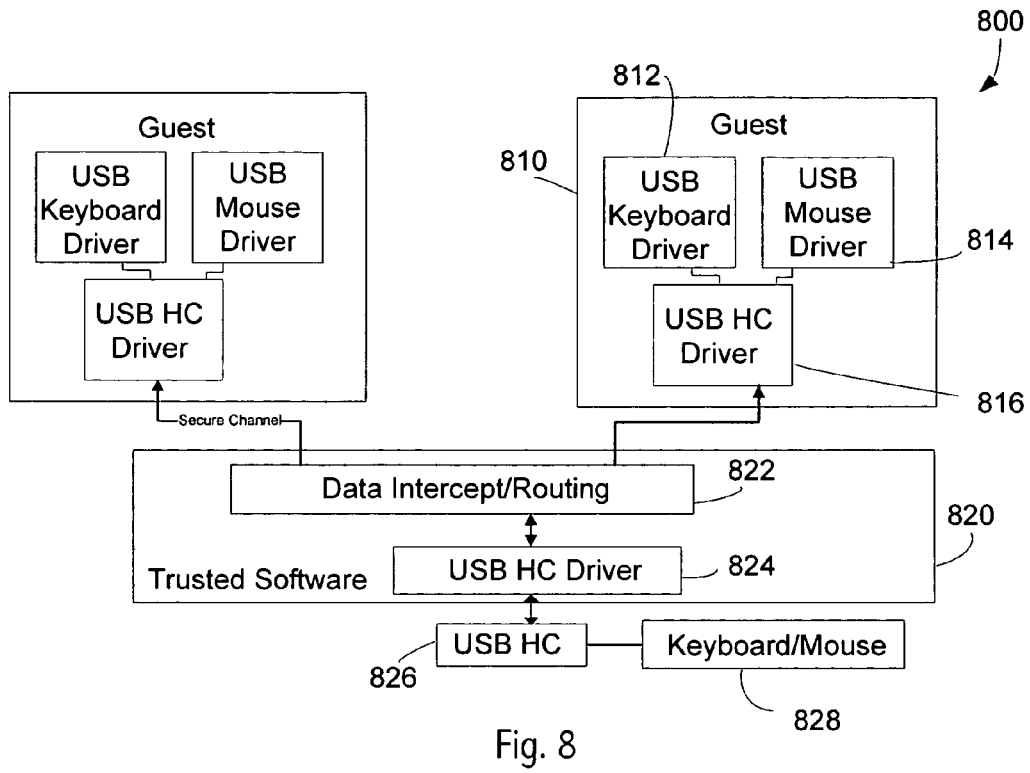
FIG. 8 is a block diagram of a relevant portion of a host computer system, with guests that implement universal serial bus (USB) input device drivers and a USB host controller (HC) driver, configured according to another embodiment of the present invention.

In general, as noted above, guests of virtualized computer systems that have implemented a USB HC driver have implemented a modified USB HC driver, which has allowed the guest to be aware of available USB devices on a USB bus while generally increasing the cost of implementing a guest. However, as is also noted above, such computer systems have not provided secure input data. According to one aspect of the present invention, as is depicted in FIG. 8, a host computer system 800 with secure input data includes a guest 810 that is implemented with standard (i.e., provided by a manufacturer of the USB device) USB device drivers 812 and 814 and a standard USB HC driver 816. As such, in this implementation, the guest 810 is unaware of the virtual environment. In this embodiment, when the USB HC driver 816, within one of the guests 810, performs enumeration, a data intercept/routing module 822 of trusted software 820 intercepts communications and responds by identifying USB devices that the guest 810 is allowed to access, according to a desired access scheme. For example, a guest may not be allowed to access a USB mass storage device that is coupled to a USB HC. By providing USB functionality to a guest using unmodified drivers, the cost of implementing individual guests is generally lower.

As is shown in FIG. 8, the trusted software 820 includes a USB HC driver 824 that facilitates communication between the module 822 and a USB keyboard and mouse 828 coupled to a USB HC 826. In this embodiment, the trusted software 820 provides desired actions (e.g., intercepts hardware accesses, routes input data, provides interrupts, etc.) for driver function and, as noted above, can limit the USB devices the guests control by only allowing access to those USB devices that the trusted software 820 is configured to allow a particular guest to access and/or control. In this manner, trusted software can distribute any USB device to an unaware guest.

It should, however, be appreciated that implementing a fully virtualized guest is not without overhead costs. That is, implementing a fully virtualized guest may require maintenance of two copies of data within separate memory locations, e.g., a first copy for a guest USB HC driver and a second copy for a trusted software USB HC driver. According to various aspects of the present invention, a virtualized computer system is capable of: establishing a channel to secure device data from an attached USB device to a guest; managing multiple channels of secure data from a single attached USB device to a guest that is the current designated guest; and determining which secure guest is the intended target of all secure data, while inhibiting unintended or malicious redirection of secure data.

Computer System with Virtual Legacy Input Device

According to various aspects of the present invention, a processor is enhanced to allow simple and more efficient virtualization of legacy input devices. More specifically, a processor is enhanced to provide a secure virtual machine (SVM) that includes the ability to intercept I/O read and write cycle access, which allows trusted software to capture guest operations related to, for example, a legacy PS/2 keyboard and mouse controller (KBC). The ability to intercept I/O accesses is facilitated by intercepting selected instructions and/or events associated with a guest. In a typical implementation, the SVM provides external direct memory access (DMA) protection, assists in interrupt handling and virtual interrupt support and may maintain guest and host translation lookaside buffers (TLBs) to reduce virtualization overhead. The SVM may implement a new processor mode (i.e., a guest mode) that is, for example, entered in response to an instruction to launch a guest. Upon launching a guest, the SVM may then grant the guest access to selected I/O devices.

Devices assigned to one guest may be prevented from accessing memory allocated to another guest by, as noted above, assigning identifications (IDs) to peripheral devices and tracking which guests have which peripheral devices and what memory area has been allocated to a given guest. The SVM includes an interrupt injection capability that allows the SVM, through the trusted software, to notify a guest when data is ready for consumption. The interrupt injection capability readily allows a host computer system to be protected and isolated from guest actions.

Figure 9:
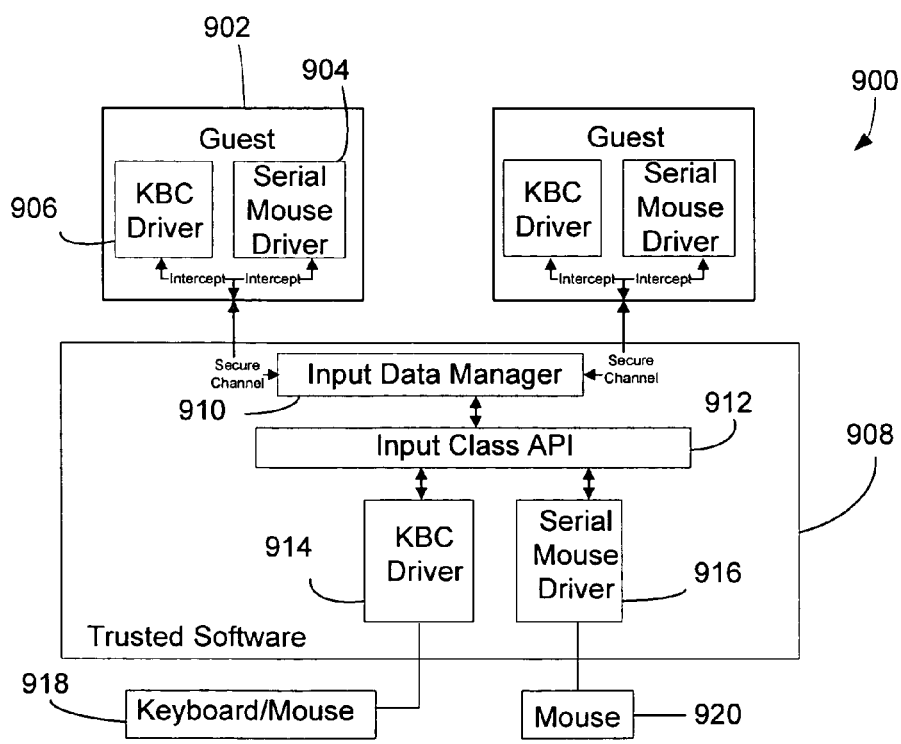
FIG. 9 is a block diagram of a relevant portion of a host computer system, with guests that implement legacy input device drivers, configured according to yet another embodiment of the present invention.

With specific reference to FIG. 9, a host computer system 900 is illustrated that implements trusted software 908, which includes a legacy PS/2 keyboard and mouse controller (KBC) driver 914 that communicates with a legacy PS/2 keyboard and mouse 918. The trusted software 908 also includes a serial mouse driver 916, an input class application program interface (API) 912 and an input data manager module 910. Input to the KBC driver 914 is provided to the API 912, which is in communication with the input data manager module 910. The serial mouse driver 916 provides input from serial mouse 920 to the API 912. As is shown, the input data manager module 910 is in communication with a plurality of guests 902, which each include a legacy KBC driver 906 and a serial mouse driver 904. The input data manager 910 routes input data to an appropriate guest via a secure channel that utilizes I/O mapped registers and, as such, requires interception of interrupts and writing to ports.

Computer System with Para-Virtual Legacy Input Device Driver

Figure 10:
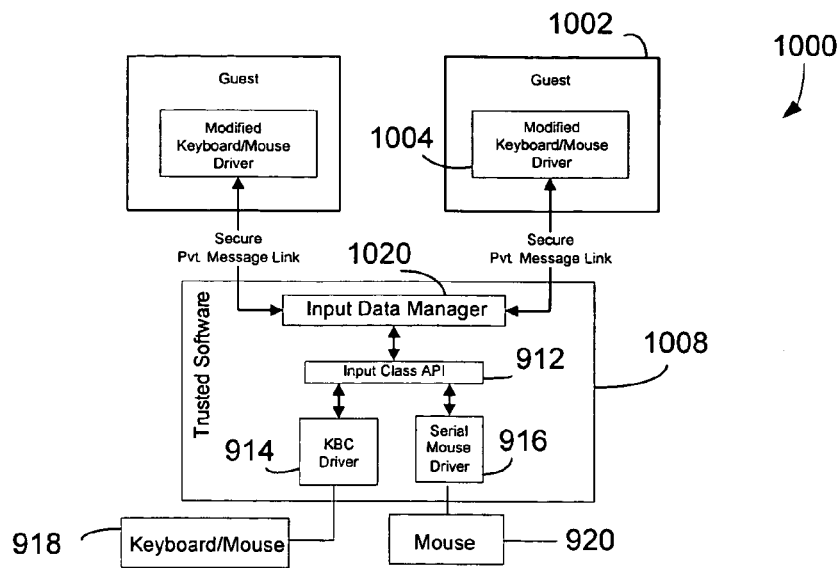
FIG. 10 is a block diagram of a relevant portion of a host computer system, with guests that implement modified input device drivers, configured according to still another embodiment of the present invention.

FIG. 10 illustrates relevant portions of a host computer system 1000 that executes trusted software 1008, which provides a communication path between legacy input devices, i.e., a legacy PS/2 keyboard and mouse 918 and a serial mouse 920, and a plurality of guests 1002. The trusted software 1008 is similar to the trusted software 908 of FIG. 9. The guests 1002 of FIG. 10 have, however, been para-virtualized and, as such, are aware of their environment (as modified keyboard/mouse drivers 1004 have been substituted for the legacy drivers 904 and 906 implemented in the guests 902 of FIG. 9). Implementation of the drivers 1004 facilitates reduced data management overhead by creating a secure private messaging interface that does not rely on I/O mapped registers (in contrast to the system of FIG. 9). That is, in this embodiment, data is routed directly between the replacement keyboard/mouse driver 1004 and input data manager 1010 (through, for example, a common memory area), without requiring the overhead of interception of interrupts and writing to ports.

USB Host Controller Virtualization Data Transfer Efficiency

According to another aspect of the present invention, data throughput may be increased by implementing efficient virtualized and para-virtualized USB HC drivers within a guest to reduce data duplication. A typical virtualized computer system has maintained its own protected data area and, as such, has been required to transfer data from its own protected data area (buffers) to a guest data area. According to one aspect of the present invention, to eliminate double copying of data, physical memory allocation for a guest is intercepted by trusted software to create a physical memory space for a USB HC driver that is mapped to the guest. The trusted software maintains addresses for the physical memory space and when a guest has data to send or receive, a shared data buffer is used by both environments, which eliminates the need to copy data from one area of memory to another. In at least one embodiment, each guest uses different buffers to transfer data between a source and destination. Since each guest has its own data space, communication between a guest USB HC driver and a USB HC driver located within trusted software is facilitated by placing data in common buffers in a memory space assigned to the guest.

Figure 11:
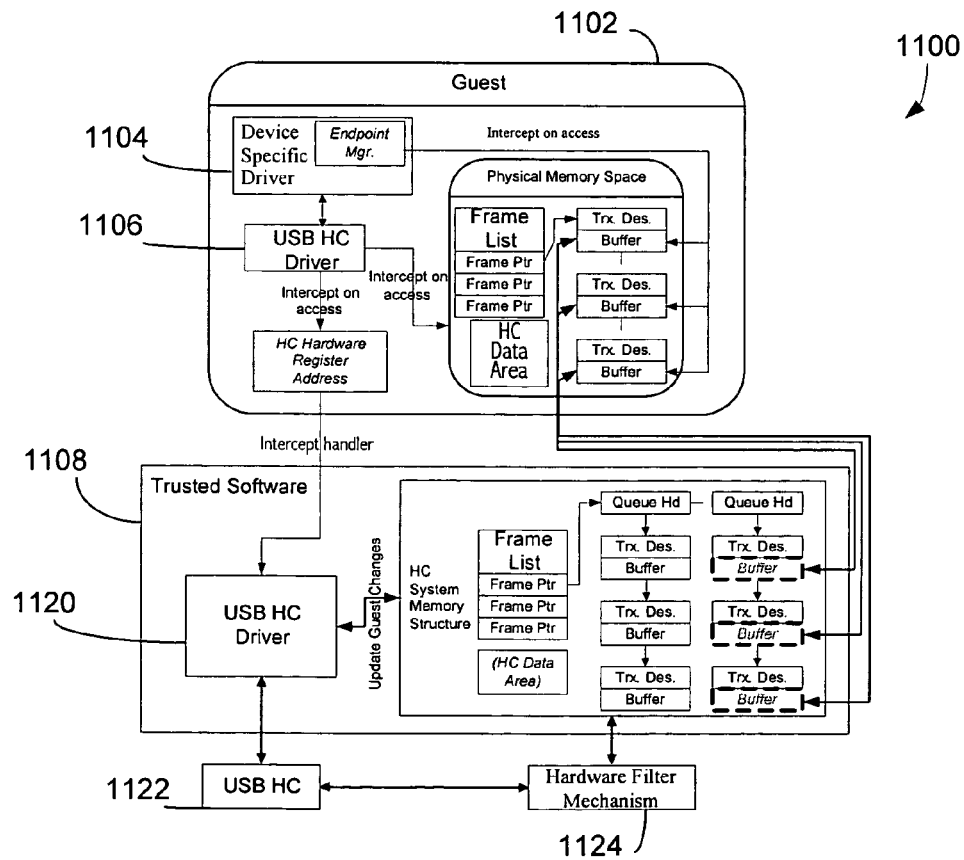
FIG. 11 is a block diagram of a relevant portion of a host computer system, with a guest that implements a USB host controller (HC) driver, configured according to another embodiment of the present invention.

With reference to FIG. 11, a host computer system 1100, with a fully virtualized USB HC driver 1106, is depicted. The system 1100 uses common buffers (in system memory) pointed to by descriptors to reduce duplication of data. As is shown, the USB HC driver 1106 and one or more USB device specific drivers 1104 are located within a guest 1102. The drivers 1104 would normally utilize endpoint managers to access the buffers to facilitate communication with USB HC driver 1120, located within trusted software 1108. However, according to this embodiment, accesses to the buffers by the guest 1102 are intercepted by the trusted software 1108. In this manner, the trusted software 1108 intercepts memory accesses initiated by the guest 1102 and updates shared memory locations, as appropriate. A hardware filter mechanism (HFM) 1124 is coupled to USB HC 1122, which is in communication with the USB HC driver 1120. The HFM 1124 ensures that a peripheral device (not shown), that is coupled to the USB HC 1122, is only allowed to access assigned areas of system memory, according to a unique ID associated with the peripheral device.

Figure 12:
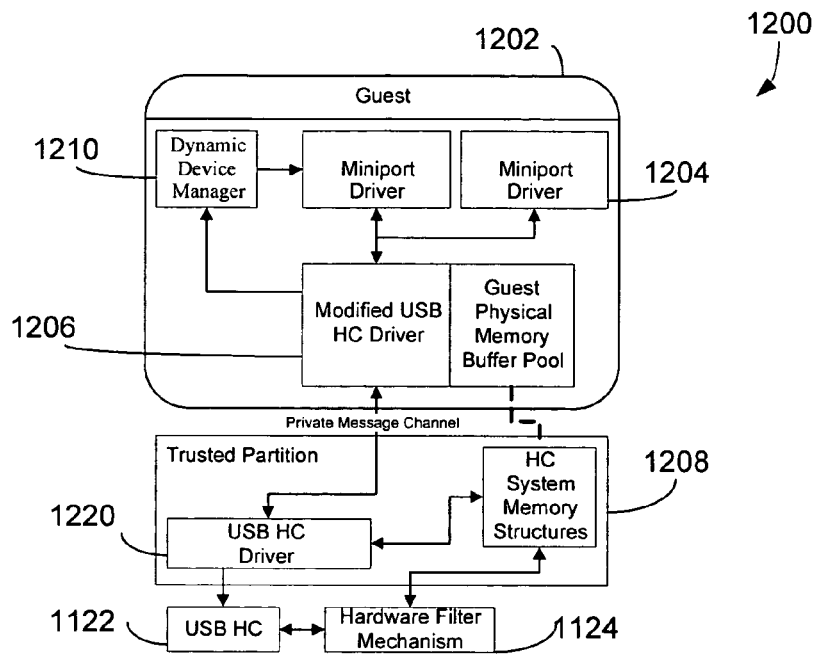
FIG. 12 is a block diagram of a relevant portion of a host computer system, with a guest that implements a modified USB HC driver, according to still another embodiment of the present invention.

With reference to FIG. 12, a relevant portion of a host computer system 1200 is depicted that is similar to the system 1100 of FIG. 11. However, in this embodiment, a guest 1202 includes a modified USB HC driver 1206, in addition to a dynamic device manager 1205 and one or more standard miniport device drivers 1204. Similar to other embodiments, implementation of the modified USB HC driver 1206 provides a secure private message channel between the guest 1202 and a USB HC driver 1220, located within trusted software 1208. In this embodiment, the trusted software 1208 breaks large data requests into sizes needed for a particular transfer type by using multiple pointers from transfer descriptors that point into a buffer created in system memory.

USB Service Guest

According to various other aspects of the present invention, universal serial bus (USB) host controller (HC) driver services may be further isolated to a separate service guest (SG) environment for additional protection of trusted software, e.g., an operating system (OS) of a host computer system. The SG may, in general, be viewed as another guest environment. According to this aspect of the present invention, a host computer system is further protected from malicious software by containerizing device drivers and USB HC drivers within, for example, different guests. Thus, the SG provides a separate secure environment for isolating a modified USB HC driver from trusted software. In various implementations, discussed in more detail below, trusted software initializes and controls communication between a SG and a guest, via a shared memory communication interface, which is dedicated to the SG and the guest.

In general, while the SG approach provides additional security, it also increases system complexity. In a SG configuration, corrupt drivers (e.g., corrupt device drivers and/or corrupt USB HC drivers) are unable to corrupt any other part of the system due to their isolation, as compared with systems containing device drivers and/or USB HC drivers that have access to OS code and data. While only one SG is shown in the disclosed embodiments, it is contemplated that any number of SGs may be implemented. For example, a host computer system may include an SG for each guest.

Figure 13A:
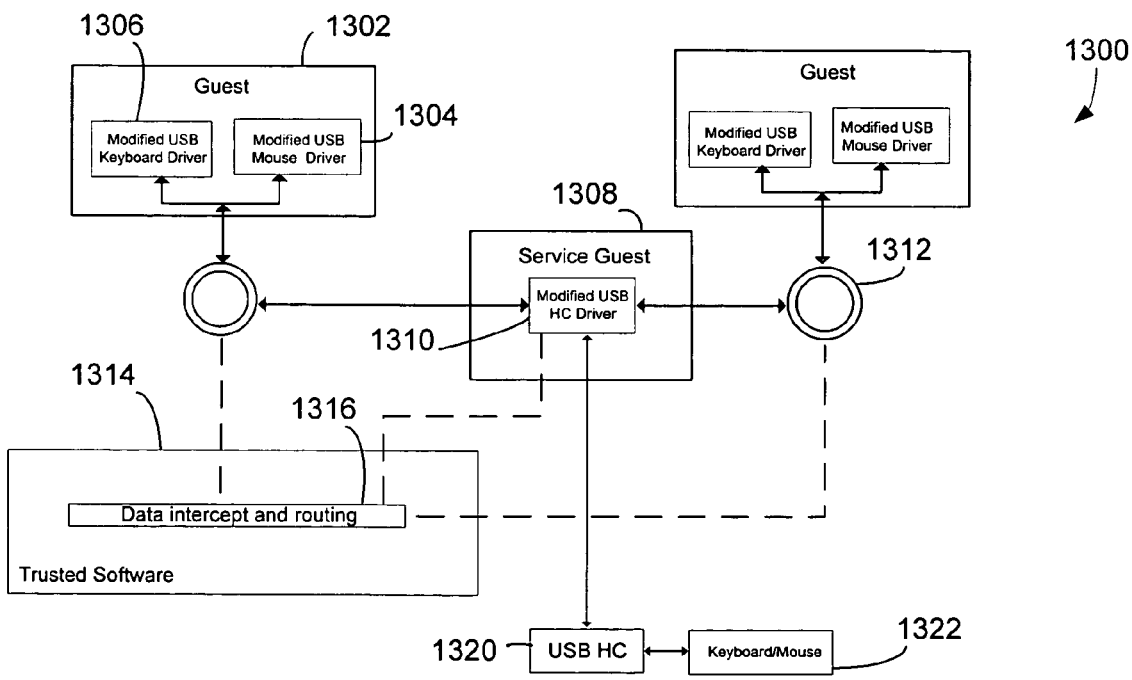
FIG. 13A is a block diagram of a relevant portion of a para-virtualized host computer system with a service guest, according to one embodiment of the present invention.

With reference to FIG. 13A, a relevant portion of a para-virtualized host computer system 1300 is depicted in which guests 1302 communicate with a SG 1308 for USB traffic through an assigned area in system memory 1312, which is facilitated by a data intercept and routing module 1316. As is shown, the guests 1302 each include a modified (or replacement) USB keyboard driver 1306 and a modified (or replacement) USB mouse driver 1304. In this embodiment, the SG 1308 includes a modified (or replacement) USB HC driver 1310 that communicates with the data intercept and routing module 1316, which is located within trusted software 1314, to determine which area of system memory an active guest is assigned. The modified USB HC driver 1310 also communicates with a USB keyboard/mouse 1322, via a USB HC 1320. The module 1316 causes traffic associated with the keyboard/mouse 1322 to be routed to a guest appropriate area of system memory.

Figure 13B:
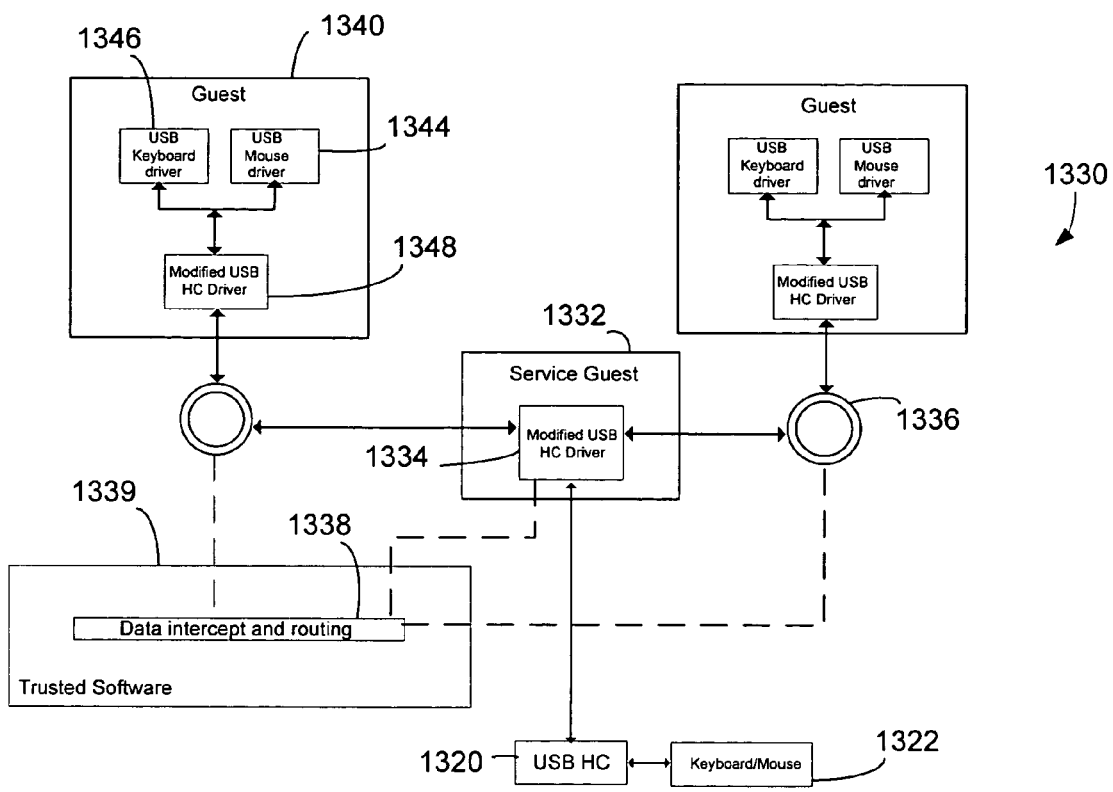
FIG. 13B is a block diagram of a relevant portion of a para-virtualized host computer system with a service guest, according to another embodiment of the present invention.

With reference to FIG. 13B, a relevant portion of another para-virtualized host computer system 1330 is depicted in which guests 1340 each include a modified USB HC driver 1348 that is in communication with a standard USB keyboard driver 1346 and a standard USB mouse driver 1344. In this embodiment, an SG 1332 includes a modified USB HC driver 1334 that communicates with a data intercept and routing module 1338, which is located within trusted software 1339, to determine which area of system memory an active guest is assigned. The modified USB HC driver 1334 communicates with a USB keyboard/mouse 1322, via a USB HC 1320. The module 1338 routes traffic associated with the keyboard/mouse 1322 to a guest appropriate area of system memory.

Figure 13C:
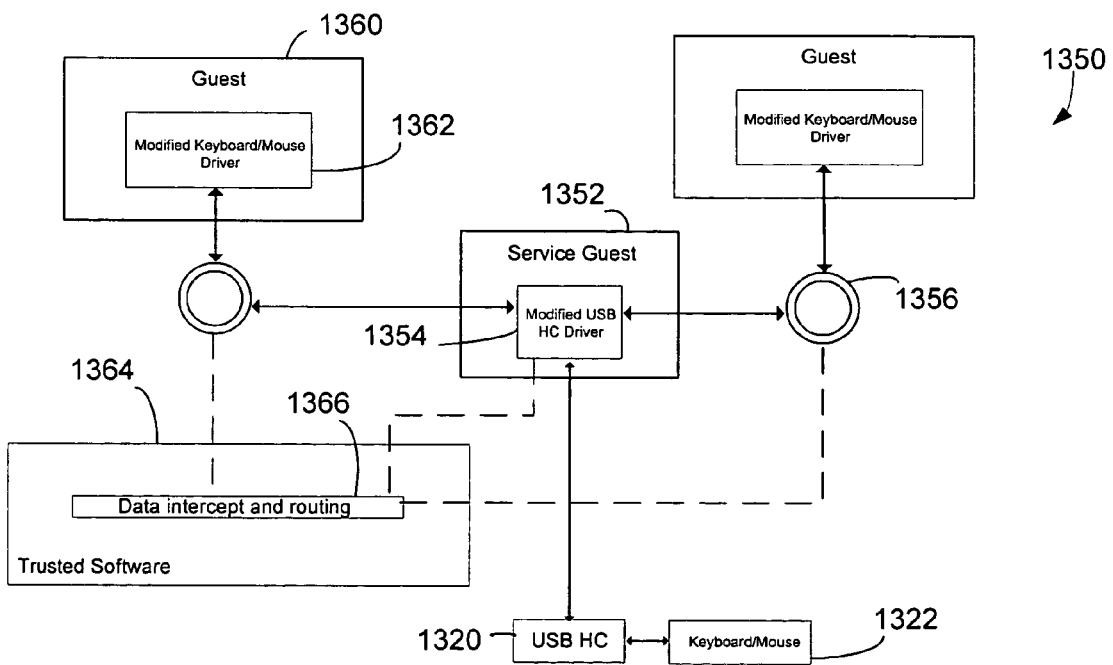
FIG. 13C is a block diagram of a relevant portion of a para-virtualized host computer system with a service guest, according to yet another embodiment of the present invention.

With reference to FIG. 13C, a relevant portion of yet another para-virtualized host computer system 1350 is depicted in which guests 1360 communicate with a SG 1352 for USB traffic through an assigned area in system memory 1356, which is facilitated by a data intercept and routing module 1366. As is shown, the guests 1360 each include a modified legacy keyboard/mouse driver 1362. In this embodiment, the SG 1352 includes a modified USB HC driver 1354 that communicates with the data intercept and routing module 1366, which is located within trusted software 1364, to determine which area of system memory an active guest is assigned. The modified USB HC driver 1354 communicates with a USB keyboard/mouse 1322, via a USB HC 1320. Similar to the embodiments of FIGS. 13A and 13B, the module 1366 causes traffic associated with the keyboard/mouse 1322 to be routed to a guest appropriate area of system memory.

Figure 14A:
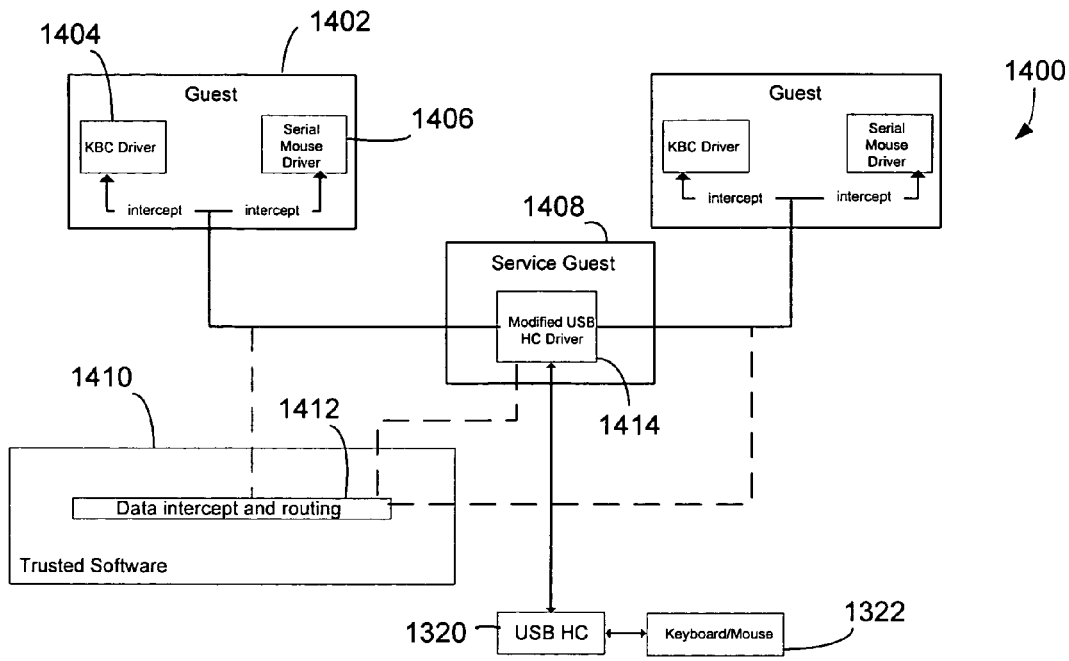
FIG. 14A is a block diagram of a relevant portion of a virtualized host computer system with a service guest, according to one embodiment of the present invention.

With reference to FIG. 14A, a relevant portion of a host computer system 1400 is illustrated, according to another embodiment of the present invention. In the system 1400, a modified USB HC driver 1414 of SG 1408 communicates with the USB HC 1320. Guests 1402 each include a standard legacy PS/2 keyboard and mouse controller (KBC) driver 1404 and a standard serial mouse driver 1406. A data intercept and routing module, located within trusted software 1410, maintains security of the system 1400 by intercepting I/O accesses and interrupts associated with the drivers 1404 and 1406 and writing to appropriate ports to facilitate communication between USB keyboard/mouse 1322, coupled to the USB HC 1320, and an in-focus one of the guests 1402.

Figure 14B:
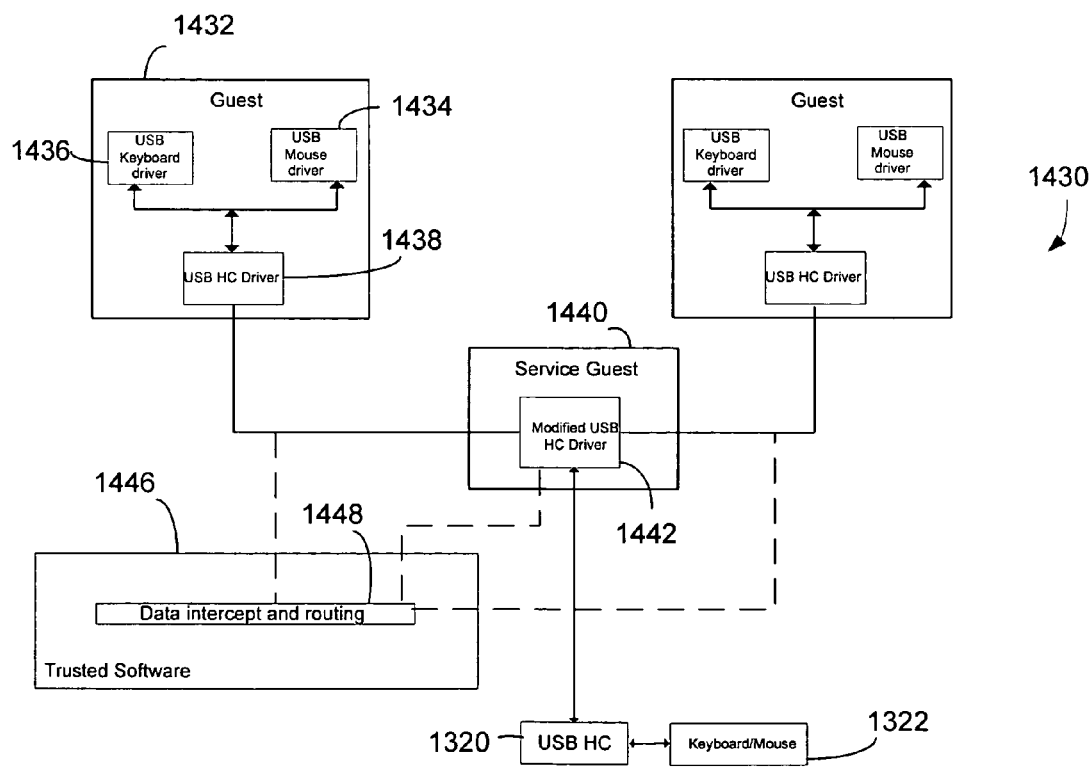
FIG. 14B is a block diagram of a relevant portion of a virtualized host computer system with a service guest, according to another embodiment of the present invention.

With reference to FIG. 14B, a relevant portion of a host computer system 1430 is illustrated, according to still another embodiment of the present invention. In the system 1430, a modified USB HC driver 1442 of SG 1440 communicates with USB keyboard/mouse 1322, via USB HC 1320, and provides information to an appropriate location in system memory as dictated by data intercept and routing module 1448, which is located within trusted software 1446. The guests 1432 each include a standard USB HC driver 1438 that is in communication with a standard USB keyboard driver 1436 and a standard USB mouse driver 1434. Communication between the fully virtualized guests may be streamlined for efficiency, as is discussed herein. Security of the system 1430 is maintained by routing traffic from the keyboard/mouse 1322 to a guest appropriate area of system memory. From the discussion herein, it should be appreciated that a wide variety of different system configurations may be implemented using service guests to achieve different efficiencies and levels of isolation between trusted software, guests and service guests.

Para-Virtual Device Drivers

Virtualized computer system may suffer performance problems, due to overhead associated with universal serial bus (USB) implementations, if guests are not provided with modified drivers that are virtual environment aware. In a typical case, the overhead is associated with intercepts and the implementation of separate USB HC drivers. As is known, USB device driver architecture allows for dynamic device addition and deletion. In a typical implementation, a USB host controller (HC) driver performs enumeration of new devices and notifies the operating system (OS) of a new device. The OS then searches for an appropriate USB device driver and causes the device driver to be loaded to facilitate communication with the USB HC driver.

Figure 15:
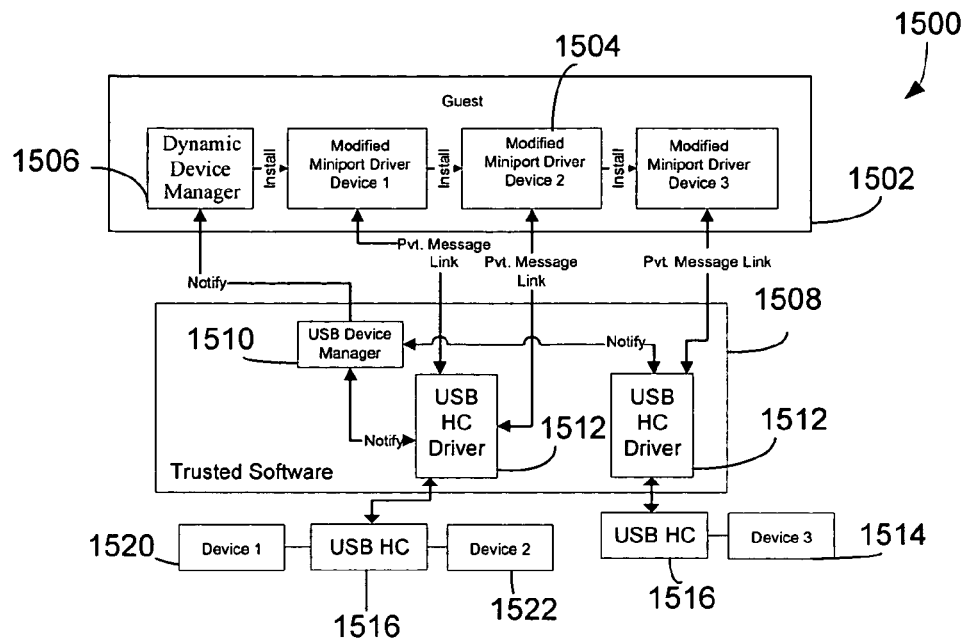
FIG. 15 is a block diagram of a relevant portion of a host computer system, with a guest that implements modified miniport device drivers, according to still another embodiment of the present invention.

Referring to FIG. 15, a relevant portion of a host computer system 1500, configured according to an embodiment of the present invention, is illustrated that implements modified (replacement) miniport device drivers 1504 to facilitate direct communication with USB HC drivers 1512, located within trusted software 1508. A dynamic device manager 1506, located within guest 1502, causes appropriate device drivers to be installed, responsive to a USB device manager 1510, within the guest 1502, based upon enumerations by the USB HC drivers 1512. The trusted software 1508 isolates the USB HC drivers 1512 and the USB device manager 1510 from the guest 1502. The USB HC drivers 1512 facilitate communication between the device drivers 1504, via private message links, and USB devices 1520, 1522 and 1514, which are coupled to USB HCs 1516.

The implementation of para-virtualized or modified device drivers facilitates the implementation of a secure private interface, between a guest device driver and a USB HC driver, that may be streamlined to increase efficiency of data throughput and to reduce control overhead. For example, the interface may be configured to package data in a desired format, store the data in an assigned area of system memory and notify a data recipient when data is ready. In this manner, data transfer may be achieved between the trusted software and a guest by simply writing data to shared memory and then notifying an intended recipient that data is ready. A private message channel for each guest may be implemented by, for example, assigning each guest to a different portion of memory.

Para-Virtual USB HC Driver—Single Guest Driver

Figure 16:
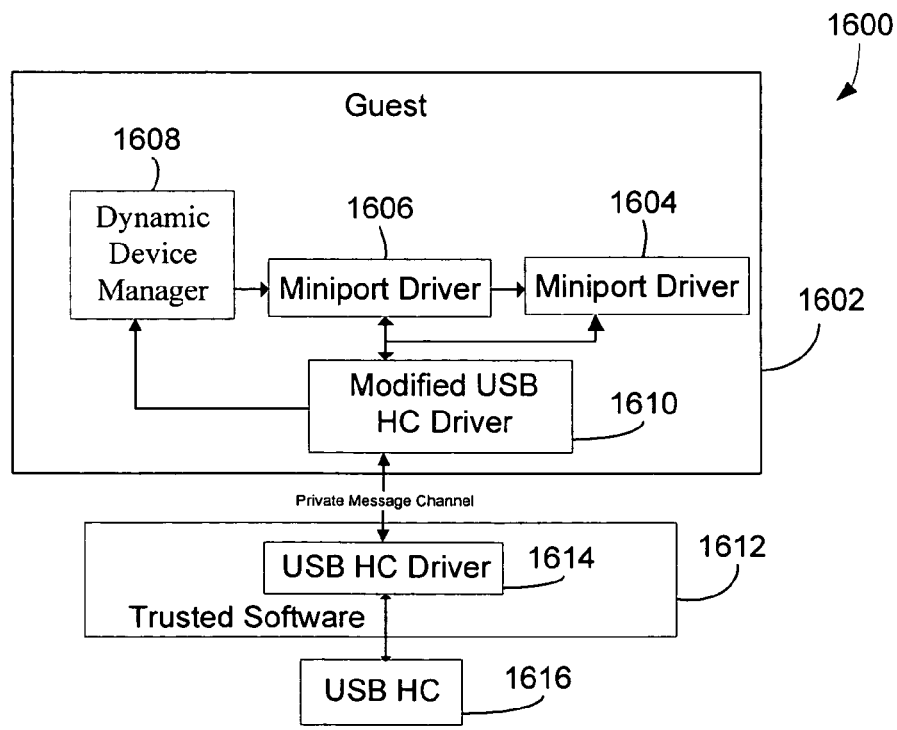
FIG. 16 is a block diagram of a relevant portion of a host computer system, with a guest that implements a modified USB HC driver, according to one embodiment of the present invention.

It should be appreciated that a virtualized computer system that implements multiple USB HCs may become relatively complex when devices coupled to different USB HCs are mapped to the same guest. According to another aspect of the present invention, a modified USB HC driver is located within a guest to reduce the complexity of a virtualized computer system. With reference to FIG. 16, a relevant portion of a host computer system 1600 is depicted that includes a single USB HC driver 1614, located within trusted software 1612, that is in communication with a single USB HC 1616. The system 1600 also includes a modified USB HC driver 1610, located within a guest 1602, that provides a secure private message channel to facilitate communication between a plurality of standard miniport device drivers 1604 and 1606 and the USB HC driver 1614. For example, the USB HC driver 1614, located within the trusted software 1612, may maintain one or more tables that provide assigned memory addresses for each guest associated with the system 1600. In this manner, communication between an attached USB device and a guest may be achieved by writing to a particular portion of memory and providing an interrupt, as is discussed above.

Para-Virtual USB HC Driver Direct Mapping

Figure 17:
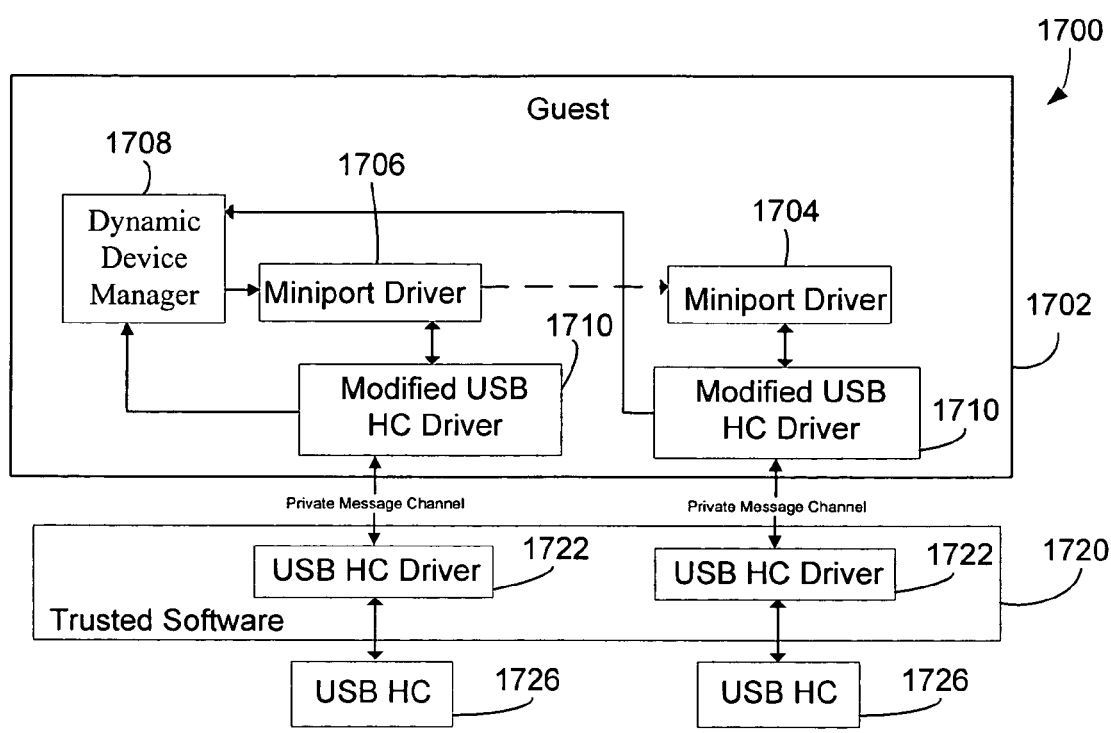
FIG. 17 is a block diagram of a relevant portion of a host computer system, with a guest that implements modified USB HC drivers in a one-to-one correspondence with USB HCs, according to another embodiment of the present invention.

With reference to FIG. 17, a relevant portion of a host computer system 1700, configured according to another aspect of the present invention, is depicted. The system 1700 includes multiple USB host controllers (HCs) 1726 and each guest 1702 includes a modified USB HC driver 1710 for each of the USB HCs 1726. Each of the USB HC drivers 1710 is in communication with a single miniport driver 1704 or 1706 and a different one of the USB HC drivers 1722, located within trusted software 1720. It should be appreciated that such a one-to-one mapping generally reduces overhead of data transfer, but may increase complexity as the trusted software 1720 must determine traffic destination for multiple USB HCs. As noted above, the implementation of para-virtual USB HC drivers within a guest facilitates the use of a private interface between the trusted software and guests that can be streamlined to increase efficiency of data throughput and reduce control overhead. A computer system virtualized in this manner provides secure channels between USB input devices attached to different USB HCs and a guest. Furthermore, the approach reduces the complexities that would be associated with a single guest para-virtualized USB HC driver communicating with multiple trusted software USB HC drivers.

Accordingly, a number of techniques have been described herein that provide a secure environment for operation of computer systems, particularly those that implement virtual machines.

What is claimed is:

1. A virtualized computer system, comprising:
    a hardware processor configured to execute at least one guest in an environment created by a virtual machine (VM), a service guest, and trusted software in communication with the at least one guest and the service guest,
    wherein the service guest includes a first universal serial bus (USB) host controller (HC) driver, wherein the first USB HC driver is in communication with a USB HC,
    wherein the at least one guest includes a second USB HC driver that is in communication with at least one USB device driver within the at least one guest, and
    wherein the trusted software facilitates secure communication between at least one USB device coupled to the USB HC and the USB device driver of the at least one guest.

2. The system of claim 1, wherein the at least one USB device driver includes at least one of a USB keyboard driver and a USB mouse driver.

3. The system of claim 1, wherein the first USB HC driver initiates enumeration of USB devices attached to the USB HC and notifies an operating system (OS) of the computer system when a new USB device is detected.

4. The system of claim 1, wherein the at least one USB device includes at least one of a USB keyboard and a USB pointing device.

5. A method comprising:

executing at least one service guest on a computer system, wherein the at least one service guest includes a first universal serial bus (USB) host controller (HC) driver in communication with a USB HC;

executing at least one guest in an environment created by a virtual machine (VM) on the computer system, the at least one guest including at least one USB device driver and a second USB HC driver that is in communication with the at least one USB device driver; and executing trusted software on the computer system, wherein the trusted software facilitates secure communication between at least one USB device coupled to the USB HC and the at least one USB device driver of the at least one guest.

6. The method of claim 5, wherein the at least one USB device driver includes at least one of a USB keyboard driver and a USB mouse driver.

7. The method of claim 5, wherein the at least one USB device includes at least one of a USB keyboard and a USB pointing device.

8. The method of claim 5, wherein the secure communication is facilitated by the trusted software through an area in system memory common to the guest and the service guest.

9. The method of claim 5, wherein the at least one guest includes a plurality of guests and each of the guests is assigned a different area in the system memory.

10. The method of claim 5, wherein trusted software causes traffic associated with the USB device to be routed to a portion of system memory associated with the guest.

* * * * *